United States Patent
Siercks et al.

(10) Patent No.: US 10,234,260 B2
(45) Date of Patent: Mar. 19, 2019

(54) METHOD TO CONTROL A DRIVE MECHANISM OF AN AUTOMATED MACHINE HAVING A CAMERA

(71) Applicant: HEXAGON TECHNOLOGY CENTER GMBH, Heerbrugg (CH)

(72) Inventors: Knut Siercks, Mörschwil (CH); Pascal Jordil, Ecoteaux (CH)

(73) Assignee: HEXAGON TECHNOLOGY CENTER GMBH, Heerbrugg (CH)

(*) Notice: Subject to any disclaimer, the term of this patent is extended or adjusted under 35 U.S.C. 154(b) by 195 days.

(21) Appl. No.: 15/143,414

(22) Filed: Apr. 29, 2016

(65) Prior Publication Data

US 2016/0364869 A1    Dec. 15, 2016

(30) Foreign Application Priority Data

Jun. 12, 2015   (EP) .................................... 15171835

(51) Int. Cl.
*B25J 9/16*         (2006.01)
*G06K 7/14*         (2006.01)
(Continued)

(52) U.S. Cl.
CPC ............ *G01B 7/012* (2013.01); *B25J 9/1666* (2013.01); *G01B 5/008* (2013.01); *G01B 11/002* (2013.01);
(Continued)

(58) Field of Classification Search
CPC .............. Y10S 367/907; G06K 9/6807; G06K 2209/19; G06K 9/18; G06K 9/6215;
(Continued)

(56) References Cited

U.S. PATENT DOCUMENTS 4,942,539 A * 7/1990 McGee .................. B25J 9/1697
                                                     348/42
5,910,894 A * 6/1999 Pryor ............... G05B 19/41875
                                                    219/121.64
(Continued)

FOREIGN PATENT DOCUMENTS

CN        101023322 A    8/2007
CN        101304842 A    11/2008
(Continued)

OTHER PUBLICATIONS uropean Search Report dated Nov. 25, 2015 as received in Application No. EP 15171835.

*Primary Examiner* — Dramos Kalapodas
(74) *Attorney, Agent, or Firm* — Maschoff Brennan

(57) ABSTRACT

The invention relates to a method to control a drive mechanism of an automated machine for approaching a point of interest on an object, the object having a surface on which a reference information of the object is provided as a one- or two-dimensional pattern, the method comprising capturing at least one image of the object by means of at least one camera of the automated machine, identifying the reference information in the at least one image, determining a position and orientation of the reference information relative to the at least one camera, determining a position and orientation of the object based on the determined position and orientation of the reference information, and controlling the drive mechanism based on the determined position and orientation of the object.

23 Claims, 3 Drawing Sheets

(51) Int. Cl.

| | |
|---|---|
| *G06K 9/32* | (2006.01) |
| *G06T 7/73* | (2017.01) |
| *G01B 11/00* | (2006.01) |
| *G01B 21/04* | (2006.01) |
| *G01B 5/008* | (2006.01) |
| *G01B 7/012* | (2006.01) |
| *G06T 19/00* | (2011.01) |
| *H04N 5/247* | (2006.01) |

(52) U.S. Cl.
CPC ......... *G01B 21/047* (2013.01); *G06K 7/1413* (2013.01); *G06K 7/1417* (2013.01); *G06K 9/3208* (2013.01); *G06K 9/3275* (2013.01); *G06T 7/74* (2017.01); *G06T 19/006* (2013.01); *H04N 5/247* (2013.01)

(58) Field of Classification Search
CPC .... G06K 9/4604; G06K 9/00671; G06K 9/72; G06K 2209/27; G06K 9/46; G06Q 10/08; G01S 7/52077; G01S 7/52065; G01S 17/89; G01S 15/899; G01S 7/52079; G01S 15/8993; G01S 15/8936; G01S 17/66; G01S 17/023; G01S 5/00; G01S 2205/00; G01S 5/16; G06T 19/006; G06T 2210/61; G06T 2200/24; G06T 7/0044; G05D 2201/0216; G05D 1/0234; A61B 5/064; A61B 8/463; A61B 8/485; A61B 8/462; A61B 5/0077; A61B 8/5238; A61B 8/4245; A61B 8/4444; A61B 8/5253; A61B 8/4427; A61B 8/4438; A61B 34/20; G01B 11/024; G01B 11/002; G01B 11/005; G01B 21/042; G01B 5/0011; G01B 5/008; G01B 21/04; G01B 5/004; G01B 7/004; G01B 21/047; B23Q 17/2428; B23Q 17/2471; B23Q 17/249; B23Q 7/00; B66F 9/0755; B66F 9/24; B25J 9/1666; B25J 9/16; G05B 19/4061

See application file for complete search history.

(56) References Cited

U.S. PATENT DOCUMENTS

| | | | |
|---|---|---|---|
| 8,804,905 B2 | 8/2014 | Ralf et al. | |
| 2006/0184013 A1* | 8/2006 | Emanuel | G01S 5/16 600/426 |
| 2011/0043515 A1* | 2/2011 | Stathis | G01C 15/002 345/419 |
| 2013/0197852 A1 | 8/2013 | Grau et al. | |
| 2013/0237811 A1* | 9/2013 | Mihailescu | A61B 5/064 600/424 |
| 2013/0279748 A1* | 10/2013 | Hastings | G06K 9/46 382/103 |
| 2014/0098382 A1 | 4/2014 | Bridges et al. | |
| 2015/0130906 A1* | 5/2015 | Bridges | G01B 21/047 348/46 |
| 2015/0159993 A1* | 6/2015 | Kocic | G01B 11/005 356/51 |
| 2015/0308818 A1* | 10/2015 | Bridges | G01S 17/66 356/3.02 |
| 2015/0310279 A1* | 10/2015 | Bare | G06K 9/00671 345/633 |
| 2015/0345932 A1* | 12/2015 | Wakai | G01B 21/047 33/503 |
| 2016/0098030 A1* | 4/2016 | Costa | B21C 51/005 700/160 |
| 2016/0284079 A1* | 9/2016 | Persely | G06T 19/006 |
| 2016/0341541 A1* | 11/2016 | Bridges | G01B 11/002 |
| 2017/0276472 A1* | 9/2017 | Becker | G01B 11/005 |

FOREIGN PATENT DOCUMENTS

| | | | | |
|---|---|---|---|---|
| DE | 102015204796 A1 * | 9/2016 | ........... | G01B 21/042 |
| JP | H6-161533 A | 6/1994 | | |
| JP | 2004-93190 A | 3/2004 | | |
| WO | 2007/032681 A1 | 3/2007 | | |
| WO | 2013/083730 A1 | 6/2013 | | |

* cited by examiner

METHOD TO CONTROL A DRIVE MECHANISM OF AN AUTOMATED MACHINE HAVING A CAMERA

FIELD

The present invention generally pertains to an automated machine capable to approach a point of interest on an object, particularly a coordinate measuring machine (CMM) capable to determine at least a spatial coordinate of a measurement point, or a computerized numerical control (CNC) machine capable to perform a tooling procedure on the object. The automated machine has a camera for capturing images of objects to be measured by the coordinate measuring machine and for determining a position and orientation of the object by means of the images, for example in order to calculate a measuring path of a probe head or tooling head of the automated machine. To overcome the limitations of the prior art, according to the invention, reference information is applied on the object of interest that allows determining the position and orientation of the object faster, more accurate and with less computation.

BACKGROUND

It is common practice to inspect a workpiece after its production to determine the accuracy of the production process, that is, workpiece dimensions, correctness of angles, etc. For instance, such a measurement can be performed using a coordinate measuring machine.

For inspection, the workpiece is put on a base of such a coordinate measuring machine and a probe head being movable relative to the base is led to predetermined measurement points of the workpiece to obtain the exact coordinate data of these points. Thus, it is possible to determine the production accuracy of the workpiece.

In a conventional 3-D measurement machine, the probe head is supported for movement along three mutually perpendicular axes (in directions X, Y and Z). Thereby, the probe head can be guided to any arbitrary point within the working volume of the coordinate measuring machine.

In order to determine the coordinates, known measurement means capable to determine the probe head's distance from a known point of origin are employed. For instance, scales or other suitable measuring means are used for this purpose. The obtained coordinate data can then be stored in a memory such as a RAM and used for further processing.

With rather complicated structures of the workpiece, however, there arises a problem that it is cumbersome to guide the probe head to the selected target points. That is, it is required to timely reduce the movement speed of the probe head in order to prevent damage of the probe head or of the workpiece due to a too strong impact, when the probe head gets into abutment against the workpiece. In particular such a problem may arise with a fully automated coordinate measuring machine.

For precisely measuring and locating objects, various photogrammetric methods are known. Usually, two cameras are needed. Solutions with only a single camera also are known, wherein the camera needs to be operated at different locations in order to get the distance information. In addition, algorithms have to manage point clouds with a huge quantity of points and, as a consequence, need massive calculation power. For instance, the application WO 2013/083730 A1 discloses a CMM having at least one camera that can be directed to the object to be measured for locating the object.

SUMMARY

Thus, there is need for a method and an automated machine capable to achieve fast determination of coordinate data of selected target points, and capable to reduce a risk of damage of a probe head or a workpiece to be measured. Some embodiments of the current invention may provide such a method and automated machine.

Some embodiments of the invention may provide a method and automated machine that allow determining the orientation of an object faster and more reliable.

Some embodiments of the invention may include a method and automated machine that allow precise location information transmission by simple means.

Some embodiments of the invention may include a method and automated machine that needs less calculating power and smaller storing capacity.

Some embodiments of the invention may include a method and coordinate measuring machine that allow identification and localization of an object with the same means.

Some embodiments of the invention may include a method and coordinate measuring machine to precisely locate the object in six degrees of freedom for more accurate subsequent treatments.

Some embodiments of the invention may include a method and coordinate measuring machine that allows an improved visualization of dimensional errors or deformations of an object to a user.

Some embodiments of the invention may include a method to control a drive mechanism of an automated machine, an automated machine.

Some embodiments of the invention include a method to control a drive mechanism of an automated machine, particularly a coordinate measuring machine or a computerized numerical control machine, for approaching a point of interest on an object, the object having a surface on which reference information of the object is provided as a one- or two-dimensional pattern. According to the invention, the method comprises capturing at least one image of the object by means of at least one camera of the automated machine, identifying the reference information in the at least one image, determining a position and orientation of the reference information relative to the at least one camera, determining a position and orientation of the object based on the determined position and orientation of the reference information, and controlling the drive mechanism based on the determined position and orientation of the object.

In one embodiment of the method according to the invention, the automated machine is a coordinate measuring machine, and the point of interest is a measuring point on an object to be measured by the coordinate measuring machine, wherein the drive mechanism is adapted to drive a probe head of the coordinate measurement machine in a manner such that the probe head is capable to approach the measurement point, and the coordinate measuring machine is adapted for determining at least one spatial coordinate of the measurement point. In one embodiment of the method, the reference information is printed on the object or on a sticker that is applied on the object, or engraved on the object, particularly laser-engraved. Particularly, the reference information is provided as a barcode or a QR code.

In another embodiment of the method, the reference information comprises object-related information, particularly information about the object type, a serial number or dimensions of the object, and identifying the reference information comprises reading the object-related information. Particularly, the object-related information is encoded in the reference information, and reading the object-related information comprises decoding the reference information.

In one embodiment, the method comprises providing object data comprising data sets of a plurality of objects, each data set comprising the reference information of an object and position information related to a position and orientation of the reference information on the object, wherein determining the position and orientation of the object is based on the position and orientation of the reference information and on the provided position information.

In another embodiment of the method according to the invention, the reference information comprises position information related to a position and orientation of the reference information on the object, identifying the reference information comprises reading the position information, and determining the position and orientation of the object is based on the position and orientation of the reference information and on the position information. In yet another embodiment of the method, determining the position and orientation of the reference information relative to the at least one camera comprises determining a distortion of the reference information by means of image recognition.

In a further embodiment of the method, the position and orientation of the object is determined in six degrees of freedom.

In one embodiment, an image of the object is presented to a user, and the method further comprises an augmented reality step, in the course of which digital information of the object is presented in the image of the object, wherein the position and orientation of the digital information in the image relative to the object is based on the determined position and orientation of the reference information, particularly wherein the digital information comprises computer aided design (CAD) data of the object and/or is superposed on the object in the image.

The invention also relates to an automated machine, particularly a CMM or a CNC machine, comprising a base, a drive mechanism for approaching a point of interest on an object, and a frame structure being movable in a horizontal and a vertical direction, wherein the base, the drive mechanism and the frame structure define a measuring volume inside which the at least one spatial coordinate of the measurement point is determinable. The automated machine further comprises at least one camera that is adapted to be directed to the measuring volume for providing at least a first image of at least a first part of the measuring volume, and a controller, adapted to control the drive mechanism on the basis of image data derived from the at least first image. According to the invention, the at least one camera is adapted to identify in the at least first image a reference information of an object in the measuring volume and to determine a position and orientation of the reference information relative to the at least one camera, and the controller is adapted to determine a position and orientation of the object based on the position and orientation of the reference information and to control the drive mechanism on the basis of the determined position and orientation of the object.

In one embodiment, the automated machine according to the invention is a coordinate measuring machine. In this embodiment, the point of interest is a measurement point of an object to be measured, the coordinate measuring machine is adapted for determining at least one spatial coordinate of the measurement point, the drive mechanism is adapted to drive a probe head that is attached to the frame structure in a manner such that the probe head is capable to move relative to the base for approaching the measurement point.

In one embodiment, the reference information is provided on the object by means of a one- or two-dimensional pattern, particularly a barcode or a QR code, particularly wherein the pattern is printed on the object or on a sticker that is applied on the object, or engraved on the object, particularly laser-engraved.

In another embodiment of the automated machine according to the invention, the reference information comprises object-related information, particularly information about the object type, a serial number or dimensions of the object, and the least one camera is adapted to read the object-related information from the identified reference information. In particular, the object-related information is encoded in the reference information, and the least one camera is adapted to decode the reference information.

In one embodiment, the automated machine comprises a data storage device that is adapted to store and to provide object data comprising data sets of a plurality of objects, each data set comprising the reference information of an object and position information related to a position and orientation of the reference information on the object, wherein the controller is adapted to determine the position and orientation of the object based on the position and orientation of the reference information and on the provided position information.

In another embodiment of the automated machine according to the invention, the reference information comprises position information related to a position and orientation of the reference information on the object, the least one camera is adapted to read the position information from the identified reference information, and the controller is adapted to determine the position and orientation of the object based on the position and orientation of the reference information and on the position information.

In yet another embodiment of the machine, the at least one camera is adapted to determine a distortion of the reference information and to determine the position and orientation of the reference information based on the determined distortion.

In a further embodiment, the controller is adapted to determine the position and orientation of the object in six degrees of freedom.

The invention also relates to a computer programme product, comprising programme code which is stored on a machine-readable medium, or being embodied by an electromagnetic wave comprising a programme code segment, and having computer-executable instructions for performing, in particular when run on a controller of an automated machine according to the invention, the following steps of the method according to the invention:

capturing at least one image of the object by means of at least one camera of the automated machine,
    identifying the reference information in the at least one image,
    determining a position and orientation of the reference information relative to the at least one camera, determining a position and orientation of the object based on the determined position and orientation of the reference information, and controlling the drive mechanism based on the determined position and orientation of the object.

BRIEF DESCRIPTION OF THE DRAWINGS

The invention in the following will be described in detail by referring to embodiments that are accompanied by figures, in which.

DETAILED DESCRIPTION

Figure 1:
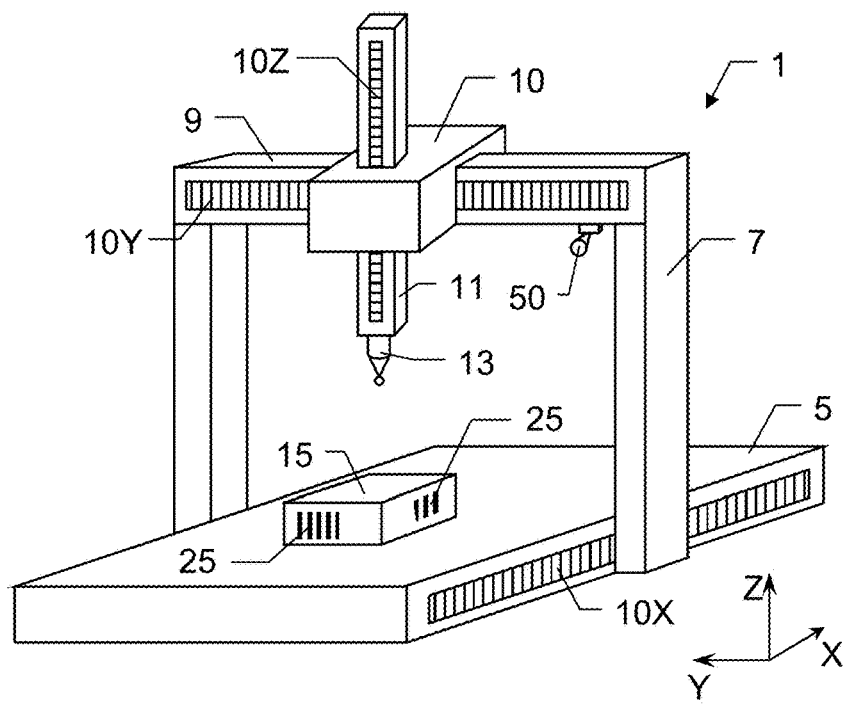
FIG. 1 is a schematic view of a first embodiment of a coordinate measuring machine as an example of an automated machine according to the invention.

In FIG. 1 a first example embodiment of an automated machine according to the invention is depicted. The depicted machine is embodied as a portal coordinate measuring machine (CMM) 1, the CMM 1 comprising a base 5 and a frame structure for linking a probe head 13 to the base 5, the frame structure comprising several frame components 7,9,10,11 being movable with respect to another. The first frame component 7 is a portal having two portal legs, which are connected by a bridging portion 9 at their upper ends. Driven by a drive mechanism (not shown), the frame component 7 is capable to move along the longitudinal sides of the base 5. This direction corresponds to a first direction X. The movement of the frame component 7 is performed by a gear rack attached to the base 5, which is meshing with a pinion on the frame component 7. Alternatively, the movement could be performed by other means, e.g. pulleys and belts.

A second frame component 10 (carriage) is movably arranged on the bridging portion 9 of the frame. The movement of the second frame component 10 is also achieved by a rack and pinion. A vertical rod 11 (sleeve), building a third frame component, is movably incorporated into the second frame component 10. At the bottom portion of the vertical rod 11 a probe head 13 is provided. The vertical rod 11 is also movable via rack and pinion.

Thus, the probe head 13 is movable to any desired point in a measuring volume (work zone) of the coordinate measuring machine 1 in the directions X, Y and Z. The measuring volume is defined by the base 5 and the frame components 7,9,11. The three space directions X, Y and Z are preferably orthogonal to one another, although this is not necessary for the present invention. It should be noted that a drive mechanism and a controller for driving the racks and pinions, and, thus, for driving the probe head 13 is not shown.

An object 15 to be measured is positioned in the space of the measuring volume on the base 5.

The probe head 13, on which a stylus is arranged in this example, is fastened on the lower free end of the rod 11. The stylus is used in a manner known per se for touching the object 15 to be measured. However, the present invention is not restricted to a tactile coordinate measuring machine and may likewise be used for coordinate measuring machines in which a measurement point is approached in a non-contact manner, i.e. for example a coordinate measuring machine with an optical scanning head. More generally, the probe head 13 may be designed for arranging a contact probe, e.g. a scanning or touch trigger probe, or a non-contact probe, particularly an optical, capacitance or inductance probe.

Two of the most common types of bearings between the movable members and the guides are air bearings or mechanical bearings (e.g. linear circulating plus rails). The air bearings give the advantage that there is no friction in the movement (which may introduce different kind of errors like angle errors or hysteresis). The disadvantage of air bearings is that the stiffness is lower than in mechanical bearings, so that particularly dynamic errors may occur. In mechanical types, the stiffness in the bearing system is typically higher but there is friction and the friction forces may introduce errors. However, the invention may be applied for both types of bearings.

Summed up, the coordinate measuring machine 1 is built for determination of three space coordinates of a measurement point on an object 15 to be measured and, therefore, comprises three linear drive mechanisms for provision of movability of the probe head 13 relative to the base 5 in the first, second and third direction (X, Y and Z direction).

Each linear drive mechanism has a linear guide, one in the first, one in the second and one in the third direction (X, Y and Z direction), respectively. In a simple embodiment, the linear guide of the X-direction drive mechanism is formed by two edge-building surfaces of the base 5, the linear guide of the Y-direction drive mechanism is formed by two or three surfaces of the bridge and the linear guide of the Z-direction drive mechanism is formed by a cubical hole in the Y-carriage member 10.

Furthermore, each linear drive mechanism comprises a movable member being supported for movement along the guide by bearings. In particular, the movable member of the X-direction drive mechanism is embodied as X-carriage having mutually facing surfaces with respect to the above mentioned two guiding surfaces of the base 5. The movable member of the Y-direction drive mechanism is embodied as Y-carriage having mutually facing surfaces with respect to the above mentioned two or three guiding surfaces of the bridge. And, the movable member of the Z-direction drive mechanism is formed by Z-column 11 (sleeve) having mutually facing surfaces with respect to the inner surfaces of the cubical hole in the Y-carriage 10.

Moreover, each linear drive mechanism comprises a linear measuring instrument for determination of a first, a second or a third drive position, respectively, of each movable member in the first, the second or the third direction (X, Y and Z direction), respectively. In this example embodiment of FIG. 1, the portal legs 7 each have a movable X-carriage which allows movement of the first frame component in X-direction.

A measuring scale 10X being part of the X-measuring instrument is schematically represented on the long side of the base 5, wherein the scale 10X extends parallel to the X-direction. The scale may be a glass measuring scale, e.g. having incremental or absolute coding, with which a drive position in the X-direction of the X-carriage can be determined. It is to be understood that the measuring instrument may furthermore contain suitable sensors for reading the measuring scale 10X, although for the sake of simplicity these are not represented here. However, it should be pointed out that the invention is not restricted to the use of glass measuring scales, and therefore may also be used with other measuring instruments for recording the drive/travelling-positions of the movable members of the drive mechanisms.

Another measuring scale 10Y is arranged parallel to the Y-direction on the bridging portion 9 of the frame. Finally, another measuring scale 10Z is also arranged parallel to the Z-direction on the Z-ram 11. By means of the measuring scales 10Y,10Z as part of the linear measuring instruments, it is possible to record the present drive positions of the carriage 10 in Y-direction and of the sleeve 11 in the Z-direction meteorologically in a manner which is known per se.

Not shown is a controlling and processing unit, which is designed to actuate the motor drives of the coordinate measuring machine 1 so that the probe head 13 travels to the measurement point. The controlling and processing unit comprises a processor and a memory. In particular, the controlling and processing unit is designed for determining the three space-coordinates of the measurement point on the object 15 as a function of at least the first, the second and the third drive position of the three drive mechanisms.

For manual operation, the control unit may be connected to a user console. It is also possible for the control unit to fully automatically approach and measure measurement points of the object 15 to be measured.

Because the design of coordinate measuring machines of the generic kind as well as the design of different linear guides and different linear measuring instruments are well known to skilled persons, it must be understood that numerous modifications and combinations of different features can be made. All of these modifications lie within the scope of the invention.

Moreover, the coordinate measuring machine 1 comprises a camera 50, in particular being built as a non-range-measuring CCD camera, for capturing images of the measuring volume. The camera 50 is arranged on the frame component 12 and, therefore, positionable by moving the frame component 9 along the X-axis. Alternatively, the camera could also be fixed to other components, e.g. to the table 5 or the Z-ram 11.

According to the present embodiment, the camera comprises a camera base and a camera objective, the objective being swivelable relatively to the camera base and, thus, providing additional alignment axis. However, the present invention is not restricted to the use of cameras being enabled for aligning their capturing directions and may likewise be used with other camera types for capturing images according to their arrangement at the CMM.

The camera 50 is aligned so that at least a first image of at least a first part of the measuring volume is capturable by the camera 50 and the at least first image is captured then. As the camera 50 is moveable along the X-axis and is alignabel according to its pivotability, additional images of the measuring volume, e.g. of additional parts of the measuring volume, may be captured.

The measuring volume can be captured at least partly and analyzed before (precisely) measuring the object 15 by means of the camera 50, e.g. in order to check if the object 15 to be measured is placed on the base 5, if the detected object 15 is of the type of demanded objects, if the object 15 is located and positioned correctly, and in particular for determining a measuring path for measuring the object 15 with the measuring sensor at the probe head 13.

The position and orientation of the camera 50 relative to the base 5 need to be known in order to determine the position and orientation of the object 15. This pose calibration (preferably in 6 DoF) can be performed before taking images of the object 15, or the pose can be determined based on the same images that are used for determining the orientation of the object 15. Also, intrinsic parameters of the camera 50, such as magnification and image distortion, have to be calibrated beforehand.

Surface data can additionally be derived from the at least first image by image processing, wherein the surface data represents a surface profile according to a content of the at least first part of the measuring volume.

On basis of the gathered data, controlling information is generated. Such controlling information is then provided for a subsequent execution of the precise measurement of the object.

Above described functionality may provide an improved user-friendliness for coordinate measuring machines as with starting the functionality an automated scan of the measuring volume may be performed and the object 15 on the base 5 may be determined (checking for the presence of the object 15 and identifying the reference information 25, respectively). Furthermore, a measuring program for measuring the object 15 may be chosen or generated and the object 15 is measured automatically.

Figure 2:
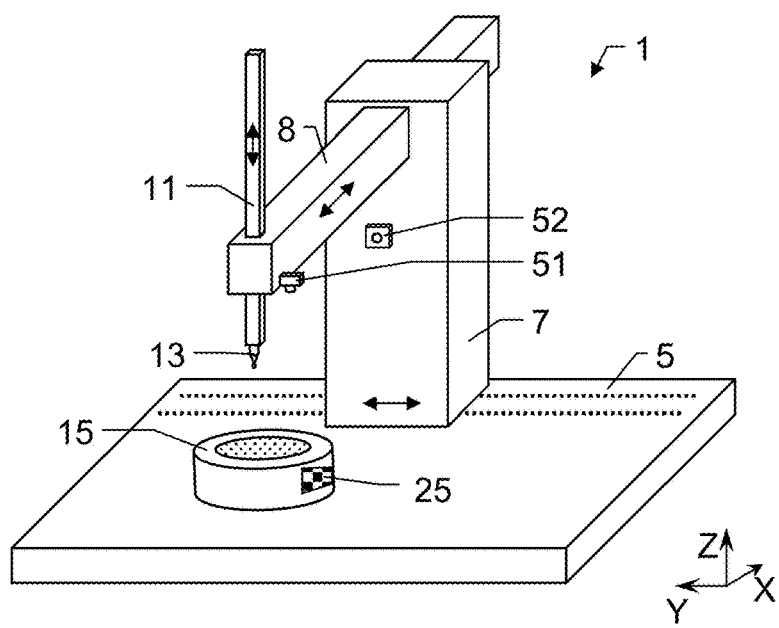
FIG. 2 is a schematic view of a second embodiment of a coordinate measuring machine as an example of an automated machine according to the invention.

FIG. 2 shows a further example embodiment of an automated machine according to the invention. The depicted CMM 1 comprises a base 5 and frame components 7,8,11 for providing movability of the probe head 13 in three directions (X-, Y- and Z-direction) relative to the base 5. Furthermore, the frame components 7,8,11 are moveable relative to each other by drive mechanisms (not shown) linking the three frame components 7,8,11 and the base 5.

An object 15 to be measured is placed on the base 5. For measuring this object 15 the probe head 13 is approached to the surface of the object 15. Coordinates are determined according to a predefined measuring path on which a tactile measuring sensor at the probe head 13 is guided and the surface profile of the object is determined depending on that measurement. According to the invention, in advance of determining the surface of the object 15, an object determination functionality is executed using the cameras 51,52 arranged at the frame structure of the CMM 1. The cameras 51,52 may be built as simple overview cameras, e.g. webcams, moveable by moving respective frame components 7,8 the cameras 51,52 are arranged at.

In context of the object determination functionality at least one image is captured with each camera 51,52 and, thus, at least an partly overview of the working zone and the object 15 is provided. In case the images do only show a part of the measuring zone without the object, the cameras are relocated and further images are captured so that the object 15 is detectable by image processing of the captured images. Such check (if the object is captured by the images) is performed by image processing of the images, as well.

Irrespective of the used type of automated machine, e.g. the CMM shown in FIG. 1 or FIG. 2 or a CNC machine, for facilitating the identification of the type of the object 15, a pattern 25 is provided on the object 15 which serves as encoded reference information of the object 15. Depending on the object to be measured, said reference information can be printed, applied on a sticker, engraved using laser or applied with any other suitable method.

Figure 3A:
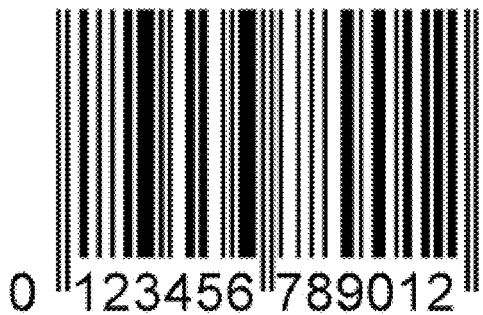
FIG. 3a-b show a barcode and a QR code as two examples for a reference pattern.
Figure 3B:
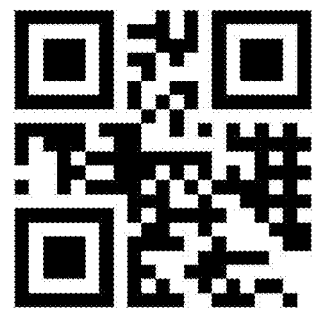

The reference information can be provided as any pattern that has an adequate form, contrast and size. Its form needs to be unique enough to easily be recognised by the vision algorithm. Its contrast also needs to be good enough to minimise false recognitions. The needed size of the said pattern mainly is influenced by the distance from the object to the cameras, but also by the field of view of the used cameras. Standard one- or two-dimensional code patterns that incorporate all the requested characteristics mentioned above are barcodes or QR codes. These are depicted in FIGS. 3a and 3b.

A pattern 25 is provided on the object 15 which serves as encoded reference information of the object 15. Depending on the object to be measured, the reference information can be printed, applied on a sticker, engraved using laser or applied with any other suitable method. The reference information can be provided as any pattern that has an adequate form, contrast and size.

Its form needs to be unique enough to easily be recognised by the vision algorithm. Its contrast also needs to be good enough to minimise false recognitions. The needed size of the said pattern mainly is influenced by the distance from the object to the cameras, but also by the field of view of the used cameras. Standard one- or two-dimensional code patterns that incorporate all the requested characteristics mentioned above are barcodes or QR codes. Examples for these are depicted in FIGS. 3a and 3b.

Figure 5:
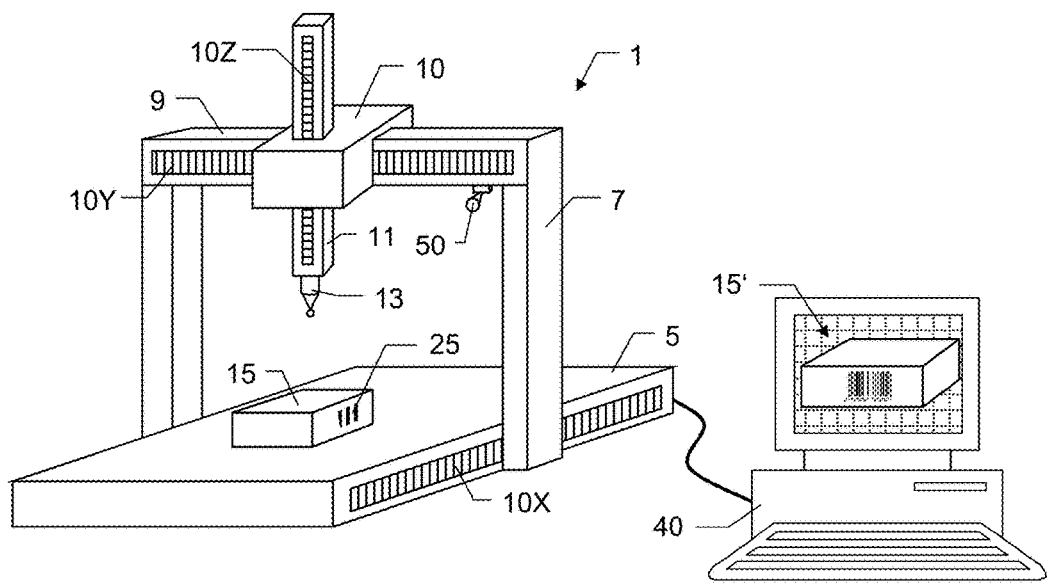
FIG. 5 is a schematic view of a further example embodiment of a coordinate measuring machine as an example of an automated machine according to the invention.

FIG. 5 shows a flow-chart illustrating an example embodiment of a method 100 according to the invention. It is important to note here that, depending on the used standard algorithms, the sequence could be different or some of the mentioned independent steps could be executed commonly.

The depicted example method 100 starts with capturing an image or a plurality of images of an object (e.g. a workpiece after production) that is positioned in a measuring volume of an automated machine (e.g. a CMM or CNC machine) by a camera or a plurality of cameras of the machine (step 110).

In the next step 120, reference information is located and identified in the captured image(s) that is suitable for determining the position and orientation of the object. As already described above, the reference information is a one- or two-dimensional pattern which is provided on a surface of the object. This pattern can be a barcode or a QR code or any other graphical pattern that is printed on or engraved in the surface, e.g. a brand logo or an inscription.

The algorithm looks for well-defined reference information in the images to localise and identify it. Such search algorithms are known in the art and can operate very fast. The outcome of this step is the localisation of the projected image of the reference information on an unknown plane.

In order to have a fast and accurate algorithm, the position of the reference information on the object and its size need to be known beforehand. Preferably, the reference information is therefore applied at a well-defined and accurately known position on the object, for example by the use of an adequate fixture. Alternatively, the reference information can be applied anywhere on the object, and its position and orientation be measured accurately in a second step. In either case, the position information of the reference information is finally known and can be stored in a data base.

Advantageously, if the reference information comprises readable code elements such as a barcode or a QR code, the position information can be coded in the reference information itself. By doing so, the vision algorithm does not need any connection to any information source, as all what is needed can be found in the acquired images.

In step 130, a relative position and orientation of the identified reference information is determined, particularly relative to the camera(s) and then—based on the knowledge of the position and orientation of the camera(s)—relative to a base of the machine. For this purpose, reference information of an object, particularly of a multitude of objects, can be provided in a data base of a data storage device. A distortion of the reference information in the image(s) can be determined. Based thereon, the relative position and orientation of the known reference information is determinable. If the identified reference information is a standard element, e.g. a barcode, the relative position and orientation can be determined even if the actual reference information is not provided.

If the reference information is a QR code or any kind of image coded information, the said coded information can be extracted. The coded information can comprise the location and orientation of the reference information on the object (position information).

If the reference information does not contain the position information, alternatively it can be extracted from an adequate data base. This is performed in optional step 140. In this step 140, object data for at least one object, particularly for a multitude of different objects, is provided in a data base of the data storage device. This data base comprises a data set for each object. Each data set comprises the reference information of the object to allow assignment of an identified reference information to the data set. The coded information univocally identifies the object, for instance as a unique identifier. The unique identifier can be used as the main key in the said data base. Each data set furthermore comprises position information related to a position and orientation of the reference information on the object. Preferably, each data set furthermore comprises information about the object's size and dimensions, e.g. a CAD model of the object. The coded information could also be a link to a website in the internet, where all relevant information concerning the object can be found. In step 150, the position and orientation of the object is determined based on the position and orientation of the reference information and on the position information—irrespective of whether the position information is provided in the pattern code itself in step 130 or by the data base in optional step 140.

Using the image distortion of the reference information, its real orientation can be extracted, i.e. the orientation of an unknown plane needs to be determined. Using the known position information of the reference information (position and orientation on the object), the precise 6-DoF object position can be calculated.

In step 160, the then known position and orientation (and optionally dimensions) of the object can be used to calculate a measurement path and control the drive mechanism of the machine accordingly.

A measuring path accounting to the identified object type and determined position and orientation is chosen and controlling information is generated depending on the chosen measuring path, providing controlling data for measuring the surface of the object by the measuring sensor at the probe head. The generated controlling data is then used for guiding the probe head (and measuring sensor) relative to the surface of the object so that the measuring points on the object are detectable with a defined point-to-point resolution.

Figure 4:
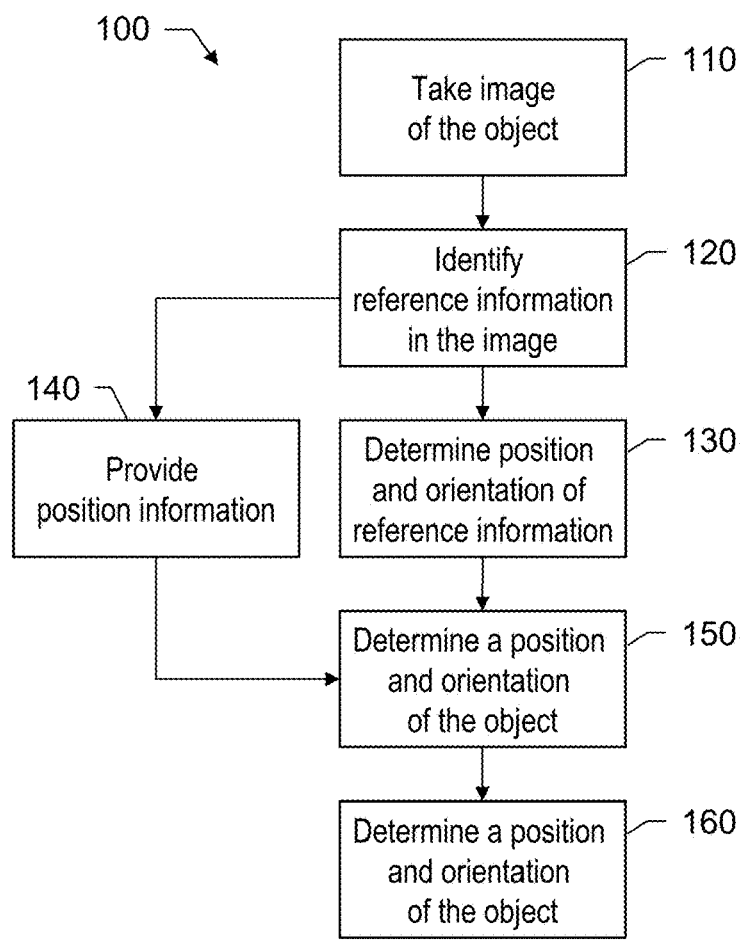
FIG. 4 illustrates an example embodiment of a method according to the invention.

FIG. 5 shows a further embodiment of an automated machine according to the invention. The depicted CMM 1 corresponds to the first embodiment depicted in FIG. 1 and further comprises a data storage device 40 for storing data sets of object data 15'. In this example, the main body of the CMM 1 is connected by means of a cable to a computer comprising the data storage device 40 and a monitor. The data storage device 40 can however be implemented into the CMM 1 as well. The data storage device 40 e.g. can be used for performing step 140 of the method illustrated in FIG. 4.

If the captured image of the object 15 is made available to a user, optionally, digital information from the respective object data 15' can be displayed in this image. Optionally, any kind of suitable digital information easily can be superposed on the object image in order to ensure that it has the right size and is displayed using the correct projection. If the provided digital information is the ideal shape of the object, extracted from a CAD file for example, the error in dimensions or the deformation of the object can be easily controlled. Although the invention is illustrated above, partly with reference to some preferred embodiments, it must be understood that numerous modifications and combinations of different features of the embodiments can be made. All of these modifications lie within the scope of the appended claims.

The invention claimed is:

1. A method to control a drive mechanism of an automated machine for approaching a point of interest on an object, the object having a surface on which reference information of the object is provided as a one- or two-dimensional pattern, the method comprising:
capturing at least one image of the object using at least one camera of the automated machine, wherein each of the at least one cameras is arranged at a predetermined known position with the automated machine;
identifying the pattern in the at least one image;
determining before starting the measurement a position and orientation of the pattern relative to the at least one camera by image recognition, wherein identifying the pattern comprises reading position information related to a position and orientation of the pattern on the object, the position information being content of the reference information encoded in the pattern or is extracted from a data base of a data base storage device as part of an object data set comprising reference information of the object and being assignable to the object by the reference information encoded in the pattern;
determining a position and orientation of the object based on the position information related to the position and orientation of the pattern on the object and the determined position and orientation of the pattern relative to the at least one camera; and
controlling the drive mechanism based on the determined position and orientation of the object.

2. The method according to claim 1, wherein:
the automated machine is a coordinate measuring machine,
the point of interest is a measuring point on an object to be measured by the coordinate measuring machine,
the drive mechanism is adapted to drive a probe head of the coordinate measurement machine in a manner such that the probe head is capable to approach the measurement point, and
the coordinate measuring machine is adapted for determining at least one spatial coordinate of the measurement point.

3. The method according to claim 1, wherein the image recognition is configured to identify the pattern provided on the object in one of the following forms:
engraved on the object;
laser-engraved on the object;
printed on the object; or
on a sticker and applying the sticker on the object, wherein the pattern comprising the reference information is provided as a barcode or QR code.

4. The method according to claim 1, wherein determining the position and orientation of the pattern relative to the at least one camera comprises determining a distortion of the pattern by means of image recognition.

5. The method according to claim 1, wherein:
the pattern as part of the reference information comprises object-related information, information about the object type, a serial number, or dimensions of the object,
identifying the pattern comprises reading the object-related information, and
the object-related information is encoded in the reference information and pattern, respectively, and reading the object-related information comprises decoding the pattern and its respective reference information, respectively.

6. The method according to claim 1, wherein:
providing object data comprising data sets of a plurality of objects from the data base storage device configured to store and provide object data, each data set comprising the pattern of an object and each data set comprising the reference information of an object, wherein the reference information comprises object-related information, information about the object type, a serial number, or dimensions of the object.

7. A method to control a drive mechanism of an automated machine, wherein the automated machine is for approaching a point of interest on an object, the object having a surface on which a reference information of the object is provided as a one- or two-dimensional pattern, the method comprising:
capturing at least one image of the object using at least one camera of the automated machine, wherein each of the at least one cameras is arranged at a predetermined known position in/at/on the automated machine;
identifying the pattern in the at least one image;
determining before starting the measurement a position and orientation of the pattern relative to the at least one camera by image recognition; and
providing a data set of the object from a storage device of the machine adapted to store and provide object data, the object data comprising data sets of a plurality of objects, the provided data set comprising reference information of the object and being assignable to the object by the reference information encoded in the pattern, wherein
the pattern comprises position information related to a position and orientation of the pattern on the object, the position information being content of the reference information or is extracted from the data base of the storage device as part of the object data set,
determining a position and orientation of the object based on the position and orientation of the pattern relative to the at least one camera and on the position information related to the position and orientation of the pattern on the object; and
controlling the drive mechanism based on the determined position and orientation of the object.

8. The method according to claim 7, further comprising determining the position and orientation of the pattern relative to the at least one camera comprises determining a distortion of the pattern by means of image recognition.

9. The method according to claim 1, wherein:
an image of the object is presented to a user, and
wherein the method comprises an augmented reality step, in the course of which digital information of the object is presented in the image of the object, wherein the position and orientation of the digital information in the image relative to the object is based on the determined position and orientation of the pattern.

10. The method according to claim 9, wherein the digital information comprises CAD data of the object and/or is superposed on the object in the image.

11. An automated machine comprising:
a base;
a drive mechanism for approaching a point of interest on an object;
a frame structure being movable in a horizontal and a vertical direction, wherein the base, the drive mechanism, and the frame structure define a measuring volume inside which the at least one spatial coordinate of the measurement point is determinable, and the automated machine further comprises:
at least one camera that is adapted to be directed to the measuring volume for providing at least a first image of at least a first part of the measuring volume, wherein each of the at least one cameras having a predetermined known position with the automated machine; and
a controller adapted to control the drive mechanism on the basis of image data derived from the at least first image;
wherein the at least one camera is adapted:
to identify in the at least first image a pattern on an object in the measuring volume, and
to determine before starting a measurement a position and orientation of the pattern relative to the at least one camera by image recognition; and
wherein the controller is adapted to determine a position and orientation of the object based on the position and orientation of the pattern relative to the camera and on a provided position information related to a position and orientation of the pattern on the object to control the drive mechanism on the basis of the determined position and orientation of the object,
wherein the identifying the pattern comprises reading position information related to a position and orientation of the pattern on the object, the position information being content of the reference information encoded in the pattern or extracted from a data base of a data storage device as part of an object data set comprising reference information of the object and being assignable to the object by the reference information encoded in the pattern.

12. The automated machine according to claim 11, wherein:
the point of interest is a measurement point of an object to be measured,
the automated machine is a coordinate measuring machine for determining at least one spatial coordinate of the measurement point,
the drive mechanism is adapted to drive a probe head in a manner such that the probe head is capable to move relative to the base for approaching the measurement point, and
the probe head is attached to the frame structure.

13. The automated machine according to claim 11, wherein:
the at least one camera is adapted to identify the pattern provided on the object by means of a one- or two-dimensional pattern, and is adapted to identify the pattern given in one of the following forms:
printed on the object or on a sticker that is applied on the object, or
engraved on the object.

14. The automated machine according to claim 11, wherein:
the reference information included in the pattern comprises object-related information, information about the object type, a serial number or dimensions of the object, and
the least one camera is adapted to read the object-related information from the identified pattern present in the at least one image.

15. The automated machine according to claim 11, wherein:
the object-related information is encoded in the pattern and its respective reference information, respectively, and
the at least one camera is adapted to decode the pattern and reference information, respectively.

16. The automated machine according to claim 15, further comprising:
the data storage device that is adapted to store and to provide object data comprising data sets of a plurality of objects, each data set comprising the reference information of the object and position information related to a position and orientation of the pattern on the object, wherein the controller is adapted to determine the position and orientation of the object based on the position and orientation of the pattern relative to the at least one camera and on the position information provided from the storage and related to the position and orientation of the pattern on the object.

17. The automated machine according to claim 11, wherein:
the reference information of the pattern comprises position information related to a position and orientation of the pattern on the object;
the at least one camera is adapted to read the position information from the identified pattern comprising the reference information; and
the controller is adapted to determine the position and orientation of the object based on the position information provided by the pattern and relative to position and orientation of the pattern on the object and on the determined position of the pattern relative to the at least one camera.

18. The automated machine according to claim 11, wherein
the at least one camera is adapted to determine a distortion of the pattern and to determine the position and orientation of the pattern based on the determined distortion, wherein the controller is adapted to determine the position and orientation of the object in six degrees of freedom.

19. A non-transitory computer program product, comprising program code which is stored on a machine-readable medium, and having computer-executable instructions for performing:
capturing at least one image of the object by means of at least one camera of the automated machine,
identifying the pattern in the at least one image,
determining before starting the measurement a position and orientation of the pattern relative to the at least one camera by image recognition,
determining a position and orientation of the object based on the determined position and orientation of the pattern relative to the camera and on provided position information related to a position and orientation of the pattern on the object, and controlling the drive mechanism based on the determined position and orientation of the object, wherein the identifying the pattern comprises reading position information related to a position and orientation of the pattern on the object, the position information being content of the reference information encoded in the pattern or is extracted from a data base of a data storage device as part of an object data set comprising reference information of the object and being assignable to the object by the reference information encoded in the pattern.

20. The method according to claim 1, wherein the pattern is a QR-code.

21. The method according to claim 1, wherein the pattern is a barcode.

22. The method according to claim 7, wherein:

an image of the object is presented to a user, and wherein the method comprises an augmented reality step, in the course of which digital information of the object is presented in the image of the object, wherein the position and orientation of the digital information in the image relative to the object is based on the determined position and orientation of the pattern.

23. The method according to claim 7, wherein the reference information of an object included in a data set of an object comprising object-related information, information about the object type, a serial number, or dimensions of the object.

* * * * *